(12) United States Patent
Wang et al.

(10) Patent No.: US 12,250,172 B2
(45) Date of Patent: Mar. 11, 2025

(54) SEQUENCE MAPPING METHOD AND APPARATUS FOR COMMON REFERENCE SIGNAL, STORAGE MEDIUM, AND TERMINAL

(71) Applicant: BEIJING UNISOC COMMUNICATIONS TECHNOLOGY CO., LTD., Beijing (CN)

(72) Inventors: Hualei Wang, Shanghai (CN); Huan Zhou, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 367 days.

(21) Appl. No.: 17/773,107

(22) PCT Filed: Oct. 22, 2020

(86) PCT No.: PCT/CN2020/122687
§ 371 (c)(1),
(2) Date: Apr. 29, 2022

(87) PCT Pub. No.: WO2021/083021
PCT Pub. Date: May 6, 2021

(65) Prior Publication Data
US 2022/0385426 A1 Dec. 1, 2022

(30) Foreign Application Priority Data
Oct. 31, 2019 (CN) .......................... 201911051748.3

(51) Int. Cl.
*H04L 5/00* (2006.01)
*H04W 72/23* (2023.01)

(52) U.S. Cl.
CPC .......... *H04L 5/0051* (2013.01); *H04L 5/0094* (2013.01); *H04W 72/23* (2023.01)

(58) Field of Classification Search
None
See application file for complete search history.

(56) References Cited

U.S. PATENT DOCUMENTS

| 2015/0085793 | A1* | 3/2015 | Luo | H04W 16/14 370/329 |
| 2017/0237584 | A1* | 8/2017 | Yan | H04J 11/0079 370/330 |

(Continued)

FOREIGN PATENT DOCUMENTS

| CN | 104158619 A | 11/2014 |
| CN | 110167159 A | 8/2019 |

(Continued)

OTHER PUBLICATIONS

Intel Corporation, "On the remaining details of DL DM-RS", 3GPP TSG RAN WG1 Meeting #90, R1-1714561, Prague, P.R. Czech, Aug. 21-25, 2017, Aug. 15, 2017 (Aug. 15, 2017).

(Continued)

*Primary Examiner* — Andre Tacdiran
(74) *Attorney, Agent, or Firm* — Harness, Dickey & Pierce, P.L.C.

(57) ABSTRACT

A method and apparatus for mapping a sequence of a common reference signal, a storage medium, and a terminal are provided. The method includes: determining a reference point for mapping the sequence of the common reference signal; and mapping the sequence of the common reference signal based on the reference point for obtaining data of the common reference signal.

4 Claims, 6 Drawing Sheets

S11 — a terminal determines a reference point for mapping the sequence of the common reference signal S12 — the terminal maps the sequence of the common reference signal based on the reference point for obtaining data of the common reference signal

(56) References Cited

U.S. PATENT DOCUMENTS

| | | | |
|---|---|---|---|
| 2019/0082427 A1 | 3/2019 | Kim et al. | |
| 2019/0158326 A1* | 5/2019 | Liao | H04L 25/0202 |
| 2020/0045707 A1* | 2/2020 | Hwang | H04W 72/23 |
| 2020/0120584 A1 | 4/2020 | Yi et al. | |
| 2020/0177334 A1* | 6/2020 | Song | H04L 25/03 |
| 2020/0374848 A1 | 11/2020 | Zhang et al. | |
| 2021/0176687 A1 | 6/2021 | Ko et al. | |
| 2021/0185624 A1* | 6/2021 | Xu | H04L 27/2659 |
| 2021/0377997 A1* | 12/2021 | Wang | H04W 72/23 |

FOREIGN PATENT DOCUMENTS

| | | | |
|---|---|---|---|
| CN | 110602731 | * | 12/2019 |
| CN | 110602731 A | | 12/2019 |
| CN | 110808823 A | | 2/2020 |
| WO | WO2018196866 | * | 11/2018 |
| WO | WO-2019098769 A1 | | 5/2019 |

OTHER PUBLICATIONS

Intel Corporation, "On the remaining details of DL DM-RS", 3GPP TSG RAN WG1 Meeting #90, R1-1712559, Prague, P.R. Czech, Aug. 21-25, 2017, Aug. 12, 2017 (Aug. 12, 2017).
International Search Report (English and Chinese) and Written Opinion of the International Searching Authority (Chinese) issued in PCT/CN2020/122687, mailed Jan. 8, 2021; ISA/CN.

\* cited by examiner

SEQUENCE MAPPING METHOD AND APPARATUS FOR COMMON REFERENCE SIGNAL, STORAGE MEDIUM, AND TERMINAL

CROSS-REFERENCE TO RELATED APPLICATIONS

This application is the national phase of International Application No. PCT/CN2020/122687, filed on Oct. 22, 2020, which claims priority to Chinese Patent Application No. 201911051748.3, filed on Oct. 31, 2019, and entitled "SEQUENCE MAPPING METHOD AND APPARATUS FOR COMMON REFERENCE SIGNAL, STORAGE MEDIUM, AND TERMINAL", the entire disclosure of which is incorporated herein by reference.

TECHNICAL FIELD

The present disclosure generally relates to communication technology field, and more particularly, to a method and apparatus for mapping a sequence of a common reference signal, a storage medium, and a terminal.

BACKGROUND

In a downlink system of the NR system, for a De-Modulation Reference Signal (DMRS), during mapping a sequence, it is necessary to determine a reference point to determine a starting point of frequency domain for mapping the sequence, and to map the DMRS through the sequence from the starting point of frequency domain for obtaining the DMRS. Wherein, the reference point is used for indicating a starting position of the sequence in the frequency domain during the mapping, and for indicating a time domain sample point position of the sequence before transforming a precoding.

However, for a downlink system which uses a single-carrier waveform, such as a satellite system or a high-frequency system, a common reference signal is usually used to demodulate a downlink data channel, a control channel, etc. For the common reference signal, there is a need for a specific method for determining the reference point.

There is a need for a method for mapping a sequence of a common reference signal, a storage medium, and a terminal, so as to use for the common reference signal to determine the reference point, and thus to obtain data of the common reference signal.

SUMMARY

Embodiments of the present disclosure provide a method and apparatus for mapping a sequence of a common reference signal, a storage medium, and a terminal, which can realize the mapping of the sequence of the common reference signal for obtaining data of the common reference signal.

In an embodiment of the present disclosure, a method for mapping a sequence of a common reference signal is provided, the method includes: determining a reference point for mapping the sequence of the common reference signal; and mapping the sequence of the common reference signal based on the reference point for obtaining data of the common reference signal.

In an embodiment of the present disclosure, an apparatus for mapping a sequence of a common reference signal is provided, the apparatus includes: a reference point determining circuitry, adapted to determine a reference point for mapping the sequence of the common reference signal; and a mapping circuitry, adapted to map the sequence of the common reference signal based on the reference point for obtaining data of the common reference signal.

In an embodiment of the present disclosure, a non-transitory storage medium is provided, the non-transitory storage medium storing one or more programs, the one or more programs comprising computer instructions, which, when executed by a processor, cause the processor to: determine a reference point for mapping the sequence of the common reference signal; and map the sequence of the common reference signal based on the reference point for obtaining data of the common reference signal.

DETAILED DESCRIPTION

As mentioned in background, in a downlink system of the NR system, for a De-Modulation Reference Signal (DMRS), there is already a solution to determine a reference point for mapping a sequence.

Specifically, for a DMRS used for demodulating a Physical Downlink Shared Channel (PDSCH), if a Physical Downlink Control Channel (PDCCH) for scheduling the PDSCH is associated with a Controlresource set 0 (CORESET 0) and a Type0-PDCCH common search space, and a Cyclic Redundancy Check (CRC) of the PDCCH is scrambled by a System Information Radio Network Tempory Identity (SI-RNTI), a reference point is a subcarrier 0 of a resource block with a smallest number in a resource block where the CORESET 0 is located. In other cases, the reference point is a subcarrier 0 of a Common resource block 0.

For a DMRS used for demodulating a PDCCH, if a CORESET associated with the PDCCH is configured by a Physical Broadcast Channel (PBCH) or configured by a controlResourceSetZero in a PDCCH-ConfigCommon, a reference point is a subcarrier 0 of a resource block with a smallest number in a resource block where the CORESET is located. In other cases, the reference point is a subcarrier 0 of a Common resource block 0.

For a DMRS used for demodulating a PBCH, a reference point is a subcarrier 0 of a resource block with a smallest number in a resource block where the PBCH is located.

Inventors of the present disclosure has found through research that, for the common reference signal, a method for mapping a sequence of a common reference signal is needed.

In the embodiment of the present disclosure, a terminal determines a reference point for mapping the sequence of the common reference signal, and maps the sequence of the common reference signal based on the reference point for obtaining data of the common reference signal. According to the embodiment of the present disclosure, by determining the reference point for mapping the sequence of the common reference signal, the mapping of the sequence of the common reference signal can be realized for obtaining data of the common reference signal. This remedies the existing technology, so that a demodulation of a downlink shared channel, a control channel and a broadcast channel can be realized.

In order to clarify the object, characteristic and advantages of embodiments of the present disclosure, the embodiments of present disclosure will be described clearly in detail in conjunction with accompanying drawings.

Figure 1:
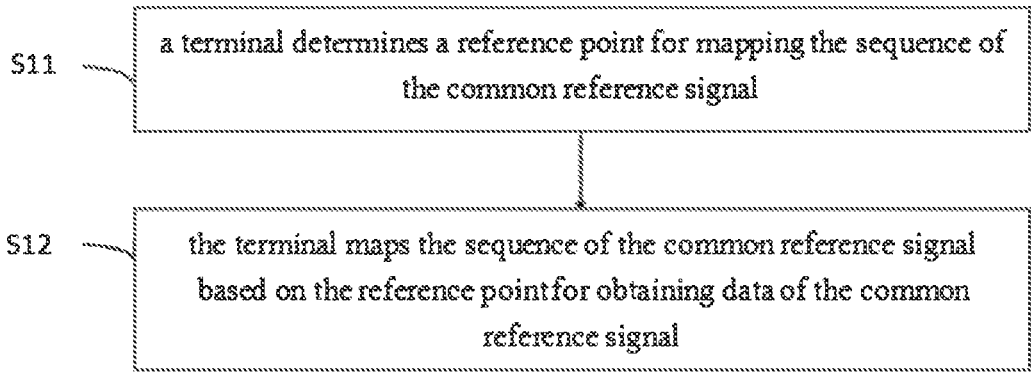
FIG. 1 schematically illustrates a flowchart of a method for mapping a sequence of a common reference signal according to an embodiment of the present disclosure.

Referring to FIG. 1, FIG. 1 schematically illustrates a flowchart of a method for mapping a sequence of a common reference signal according to an embodiment of the present disclosure. The method may include S11 and S12.

In S11, a terminal determines a reference point for mapping the sequence of the common reference signal.

In S12, the terminal maps the sequence of the common reference signal based on the reference point for obtaining data of the common reference signal.

In the specific implementation of S11, due to the reference point is determined based on the common reference signal, compared with the existing technology which is based on DMRS to divide focusing on the time domain resource. For signals carried on different time domain resources, the reference point is determined in different ways.

Figure 2:
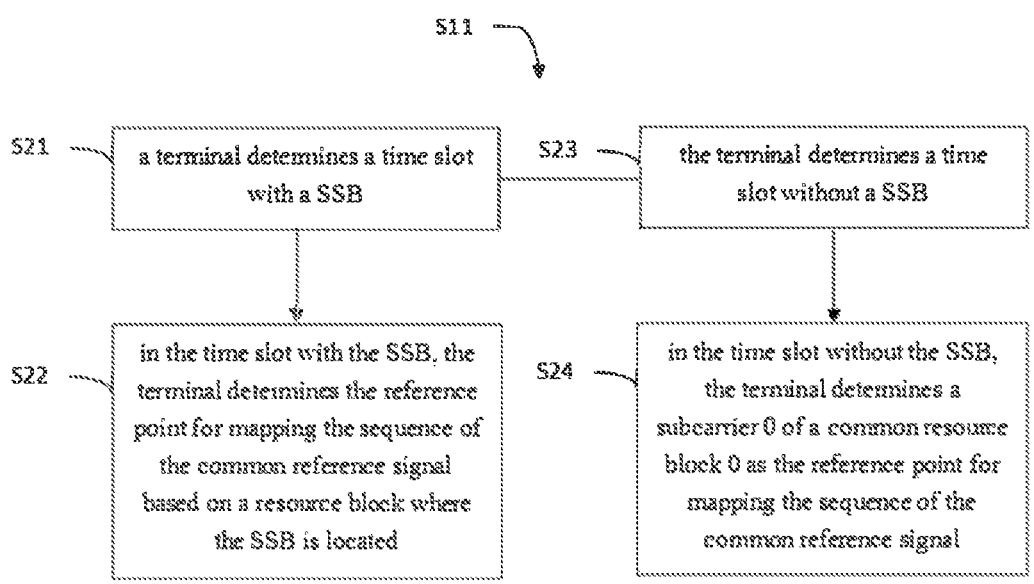
FIG. 2 schematically illustrates a flowchart of a specific implementation of S11 in FIG. 1.

Referring to FIG. 2, FIG. 2 schematically illustrates a flowchart of a specific implementation of S11 in FIG. 1. The method may include S21 and S22, and may also include S23 and S24, which will be described below.

In S21, a terminal determines a time slot with a Synchronization Signal and PBCH block (SSB).

In S22, in the time slot with the SSB, the terminal determines the reference point for mapping the sequence of the common reference signal based on a resource block where the SSB is located.

According to the embodiment of the present disclosure, the terminal may determine the time slot with the SSB, and in the time slot with the SSB, determine the reference point for mapping the sequence of the common reference signal based on the resource block where the SSB is located. The reference point can be determined based on existing parameters of the SSB, so that the common reference signal can be mapped for obtaining the data of the common reference signal.

Further, the terminal determines the reference point for mapping the sequence of the common reference signal based on a resource block where the SSB is located, including: determining a subcarrier 0 of a resource block with a smallest number in the resource block where the SSB is located as a reference point for mapping a first sequence used for demodulating a Physical Broadcast Channel (PBCH). Wherein, the sequence of the common reference signal includes the first sequence used for demodulating the PB CH.

According to the embodiment of the present disclosure, for the PBCH, the terminal determines the subcarrier 0 of the resource block with the smallest number in the resource block where the SSB is located as the reference point for mapping the first sequence used for demodulating the PBCH. Compared with an existing protocol scheme which is only applicable to symbols where the CORESET 0 and the PDSCH scheduled by the CORESET0 is located, the embodiment of the present disclosure can be applied to all symbols of the common reference signal, so that the downlink shared channel, the control channel and the broadcast channel can be demodulated.

Further, for a sequence used for demodulating a CORESET 0 and/or a PDSCH scheduled by the CORESET0, the terminal may determine a reference point based on a resource block offset between the CORESET 0 and a resource block where a SSB is located.

It should be pointed out that an offset is defined as from a smallest RB index of a CORESET associated with a Type0-PDCCH Common search space (CSS) set to a smallest resource block index where a common resource block overlaps with a first resource block of SS/PBCH block, based on a subcarrier gap of a CORESET associated with a Type0-PDCCH CSS set provided by a subCarrierSpacingCommon.

Figure 3:
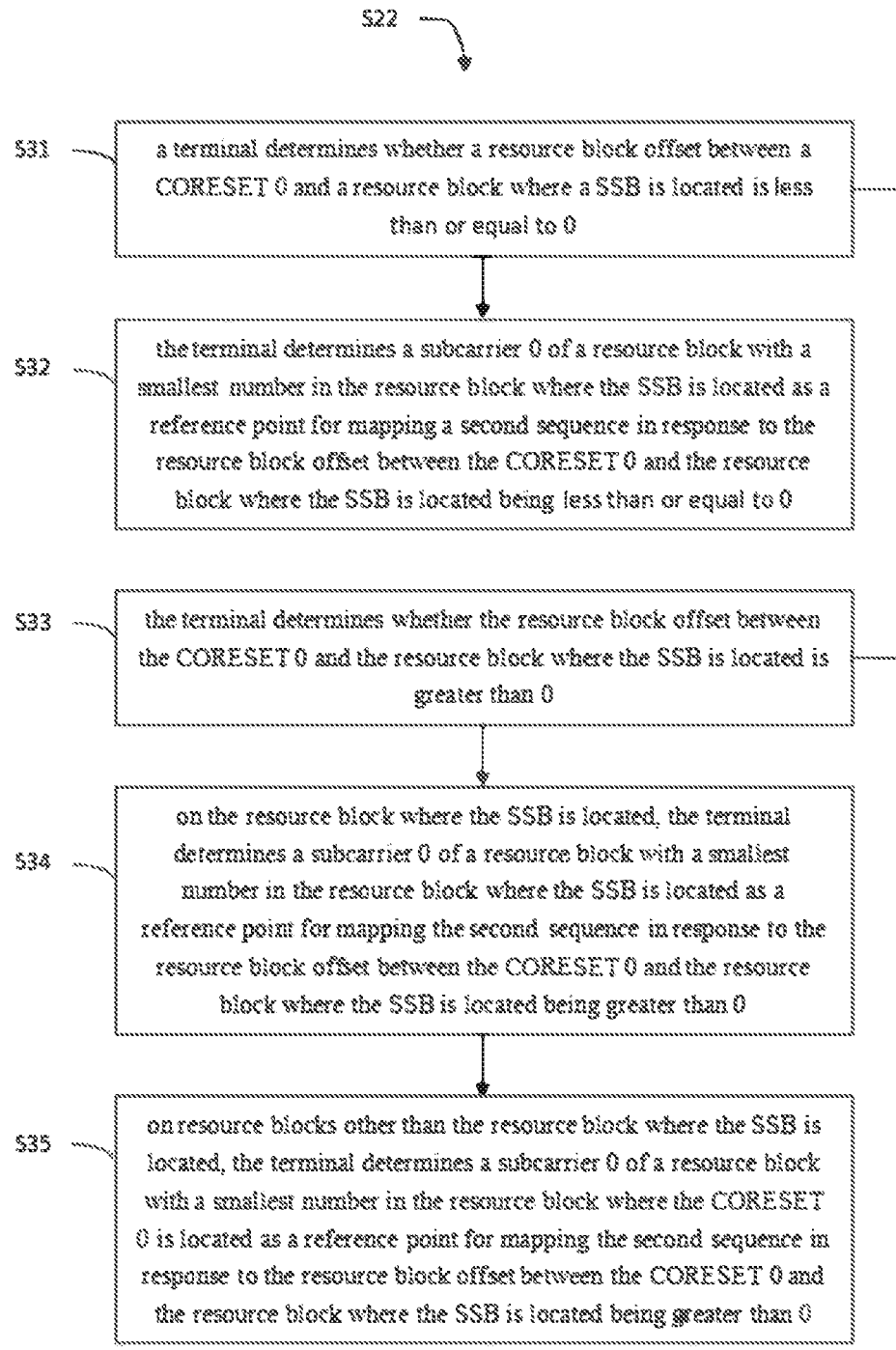
FIG. 3 schematically illustrates a flowchart of a specific implementation of S22 in FIG. 2.

Referring to FIG. 3, FIG. 3 schematically illustrates a flowchart of a specific implementation of S22 in FIG. 2. S22 may include S31 and S32, and may also include S33, S34 and S35, which will be described below.

In S31, a terminal determines whether a resource block offset between a CORESET 0 and a resource block where a SSB is located is less than or equal to 0.

In S32, the terminal determines a subcarrier 0 of a resource block with a smallest number in the resource block where the SSB is located as a reference point for mapping a second sequence in response to the resource block offset between the CORESET 0 and the resource block where the SSB is located being less than or equal to 0.

Wherein, the sequence of the common reference signal includes the second sequence used for demodulating the CORESET 0 and/or a PDSCH scheduled by the CORESET 0.

According to the embodiment of the present disclosure, for the CORESET 0 and/or the PDSCH scheduled by the CORESET 0, the terminal may determine the subcarrier 0 of the resource block with the smallest number in the resource block where the SSB is located as the reference point. The embodiment of the present disclosure may be applied to the common reference signal, so that the downlink shared channel, the control channel and the broadcast channel can be demodulated.

In S33, the terminal determines whether the resource block offset between the CORESET 0 and the resource block where the SSB is located is greater than 0.

In S34, on the resource block where the SSB is located, the terminal determines a subcarrier 0 of a resource block with a smallest number in the resource block where the SSB is located as a reference point for mapping the second sequence in response to the resource block offset between the CORESET 0 and the resource block where the SSB is located being greater than 0.

In S35, on resource blocks other than the resource block where the SSB is located, the terminal determines a subcarrier 0 of a resource block with a smallest number in the resource block where the CORESET 0 is located as a reference point for mapping the second sequence in response to the resource block offset between the CORESET 0 and the resource block where the SSB is located being greater than 0. Wherein, resource blocks other than the resource block where the SSB is located are resource blocks in the time slot with the SSB.

Wherein, the sequence of the common reference signal includes the second sequence used for demodulating the CORESET 0 and/or a PDSCH scheduled by the CORESET 0.

According to the embodiment of the present disclosure, for the CORESET 0 and/or the PDSCH scheduled by the CORESET 0, in the resource block with the SSB, the terminal may determine the subcarrier 0 of the resource block with the smallest number in the resource block where the SSB is located as the reference point. In the resource block without the SSB, the terminal may determine the subcarrier 0 of the resource block with the smallest number in the resource block where the CORESET 0 is located as the reference point. The embodiment of the present disclosure may be applied to the common reference signal, so that the downlink shared channel, the control channel and the broadcast channel can be demodulated.

Further, the second sequence may be obtained by shifting the original sequence used for demodulating the CORESET 0 and/or the PDSCH scheduled by the CORESET 0 cyclically.

It should be pointed out that when the results obtained by determining the subcarrier 0 of the resource block with the smallest number in the resource block where the SSB is located as the reference point and by determining the subcarrier 0 of the resource block with the smallest number in the resource block where the CORESET 0 is located as the reference point are consistent, a number of bits of the cyclic shift may be 0.

When the results obtained by determining the sub carrier 0 of the resource block with the smallest number in the resource block where the SSB is located as the reference point and by determining the subcarrier 0 of the resource block with the smallest number in the resource block where the CORESET 0 is located as the reference point are inconsistent, the second sequence needs to be shifted cyclically.

Specifically, the sequence of the common reference signal includes a second sequence used for demodulating a CORESET 0 and/or a PDSCH scheduled by the CORESET 0. The terminal determines the reference point for mapping the sequence of the common reference signal based on the resource block where the SSB is located, including: determining whether a resource block offset between the CORESET 0 and the resource block where the SSB is located is greater than 0; determining a subcarrier 0 of a resource block with a smallest number in the resource block where the CORESET 0 is located in response to the resource block offset between the CORESET 0 and the resource block where the SSB is located being greater than 0; determining an original sequence used for demodulating the CORESET 0 and/or the PDSCH scheduled by the CORESET 0; shifting the original sequence cyclically for obtaining the second sequence; and determining the subcarrier 0 of the resource block with a smallest number in the resource block where the CORESET 0 is located as a reference point for mapping the second sequence.

According to the embodiment of the present disclosure, the terminal shifts the original sequence cyclically, so that the sequence of the common reference signal can be used for mapping to obtain the data of the common reference signal.

Continuing to refer to FIG. 2, in the specific implementation of S22, the terminal may determine a reference point based on an offset between a resource block where a SSB is located and the reference point.

Figure 4:
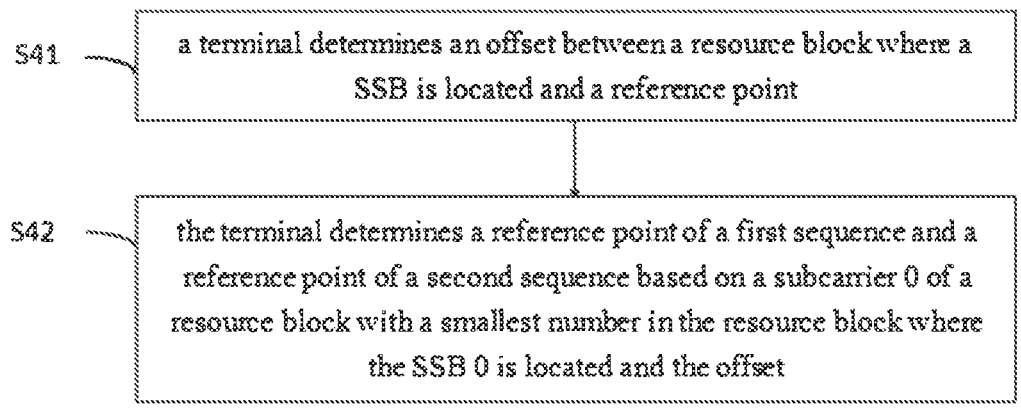
FIG. 4 schematically illustrates a flowchart of another specific implementation of S22 in FIG. 2.

Referring to FIG. 4, FIG. 4 schematically illustrates a flowchart of another specific implementation of S22 in FIG. 2. S22 may include S41 and S42.

In S41, a terminal determines an offset between a resource block where a SSB is located and a reference point.

In S42, the terminal determines a reference point of a first sequence and a reference point of a second sequence based on a subcarrier 0 of a resource block with a smallest number in the resource block where the SSB 0 is located and the offset.

Wherein the sequence of the common reference signal includes the first sequence used for demodulating a PBCH, and the second sequence used for demodulating a CORESET 0 and/or a PDSCH scheduled by the CORESET 0.

Figure 5:
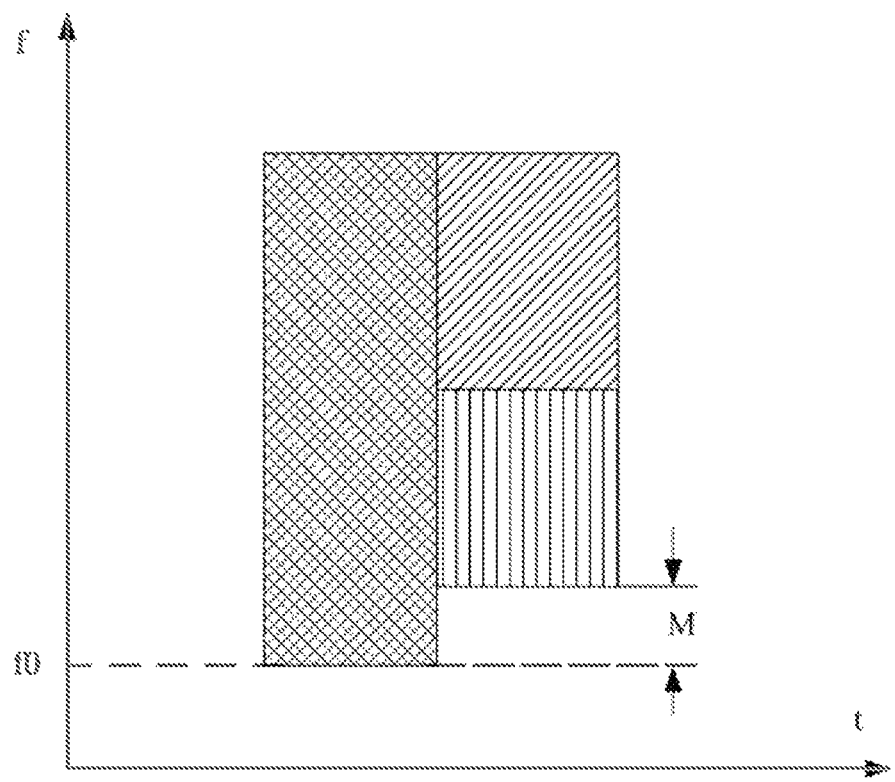
FIG. 5 schematically illustrates a diagram of a time-frequency resource according to an embodiment of the present disclosure.

Referring to FIG. 5, FIG. 5 schematically illustrates a diagram of a time-frequency resource according to an embodiment of the present disclosure.

Specifically, in a time slot where the SSB is located, f0 represents a reference point for mapping a sequence used for demodulating a downlink control channel and a data channel in a PBCH, in a CORESET 0 and/or in a PDSCH scheduled by the CORESET0, M represents an offset between the reference point f0 and the SSB.

In a specific implementation, a value of M may be predefined, for example, the value of M is configured to be 100. Wherein, the value of M may be predefined by a protocol.

It should be pointed out that the offset is defined as the difference between a smallest resource block index where a common resource block overlaps with a first resource block of SS/PBCH block and an index of the common resource block where the reference point is located based on a subcarrier gap of the SSB.

According to the embodiment of the present disclosure, the terminal may determine the offset M between the reference point and the SSB, and determine a reference point f0 of a first sequence and a reference point f0 of a second sequence based on the resource block where the SSB is located and the offset M, the reference point f0 which is applied to the common reference signal can be determined, so that the downlink shared channel, the control channel and the broadcast channel can be demodulated.

Continuing to refer to FIG. 2, in S23, the terminal determines a time slot without a SSB.

In S24, in the time slot without the SSB, the terminal determines a subcarrier 0 of a common resource block 0 as the reference point for mapping the sequence of the common reference signal.

According to the embodiment of the present disclosure, the terminal may determine the time slot without the SSB, and in the time slot without the SSB, the scheme of determining the subcarrier 0 of the common resource block 0 as the reference point for mapping the sequence of the common reference signal in the existing technology is multiplexed, the terminal may determine the reference point for mapping the sequence of the common reference signal, so that the mapping of the common reference signal can be realize to obtain the data of the common reference signal, which is conductive to improving the adaptability of integration with the existing technology.

It should be pointed out that, in another specific implementation manner of the embodiment of the present disclosure, in a time slot without a SSB, a reference point for mapping a sequence of a common reference signal may also be determined in various ways, so as to facilitate the user to select according to an actual situation.

Specifically, in a time slot without the SSB, a terminal may determine a reference point based on a time slot with the SSB.

More specifically, the terminal determines the reference point for mapping the sequence of the common reference signal, including: in a time slot with the SSB, determining a frequency domain resource with the SSB as a SSB frequency domain resource; in a time slot without the SSB or the time slot with the SSB, determining that a frequency domain resource of a first signal to be demodulated is located in the SSB frequency domain resource; and determining a subcarrier 0 of a resource block with a smallest number in the resource block where the SSB is located as a reference point for mapping a sequence used for demodulating the first signal to be demodulated; and/or in the time slot with the SSB, determining a frequency domain resource with a CORESET 0 as a CORESET 0 frequency domain resource; in the time slot without the SSB or the time slot with the SSB, determining that a frequency domain resource of a second signal to be demodulated is located in the CORESET 0 frequency domain resource but not in the SSB frequency domain resource; and determining a subcarrier 0 of a resource block with a smallest number in the resource block where the CORESET 0 is located as a reference point for mapping a sequence used for demodulating the second signal to be demodulated.

Further, the second signal to be demodulated is obtained by shifting the original sequence used for demodulating the second signal to be demodulated cyclically.

Further, the terminal determines a reference point for mapping the sequence of the common reference signal, including: for some signals other than the first signal to be demodulated and the second signal to be demodulated, determining a subcarrier 0 of a common resource block 0 as the reference point for mapping the sequence of the common reference signal.

Figure 6:
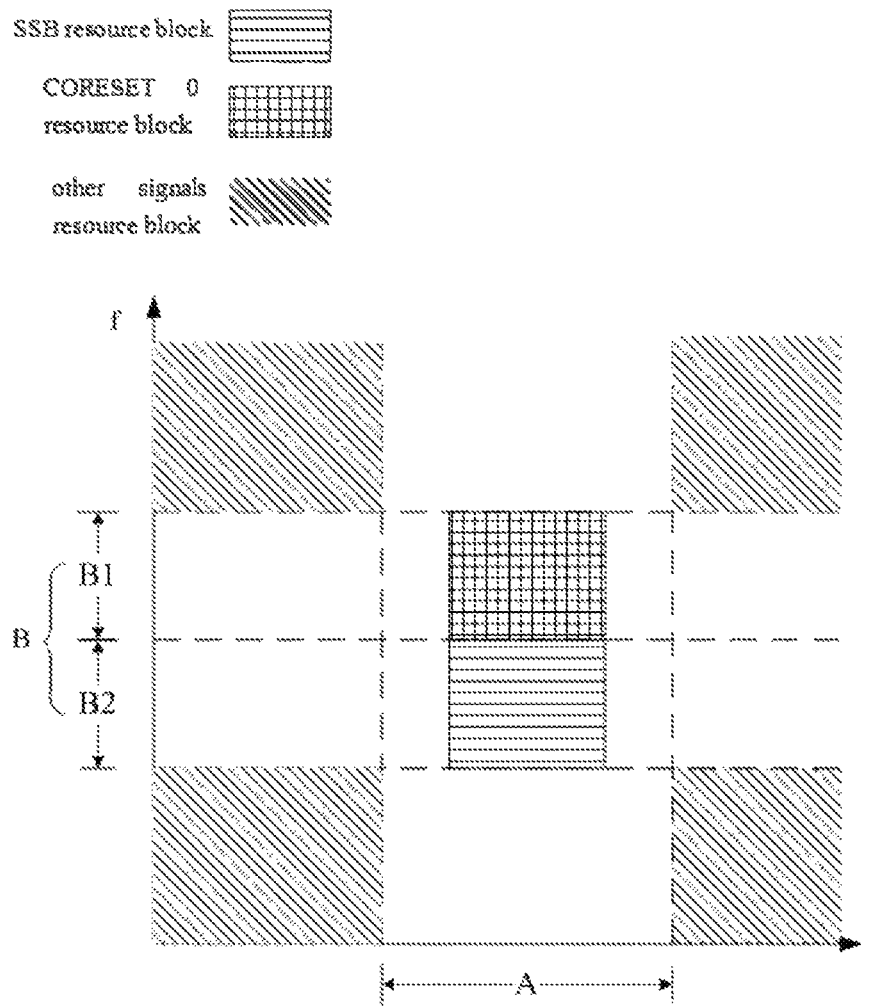
FIG. 6 schematically illustrates a diagram of a time-frequency resource according to another embodiment of the present disclosure.

Referring to FIG. 6, FIG. 6 schematically illustrates a diagram of a time-frequency resource according to another embodiment of the present disclosure.

Specifically, an area A is used for indicating a time slot where a SSB is located, and an area B is used for indicating frequency domain resources of the SSB and a CORESET 0. Wherein, an area B1 is used for indicating the frequency domain resource of the CORESET 0, and an area B2 is used for indicating the frequency domain resource of the SSB.

Specifically, in a time slot without the SSB or in a time slot with the SSB, the area B1 corresponds to a frequency domain resource of a second signal to be demodulated. A subcarrier 0 of a resource block with a smallest number in the resource block where the SSB is located is determined as a reference point for mapping a sequence used for demodulating the second signal to be demodulated.

In a time slot without the SSB or in a time slot with the SSB, the area B2 corresponds to a frequency domain resource of a first signal to be demodulated. A subcarrier 0 of a resource block with a smallest number in the resource block where the SSB is located is determined as a reference point for mapping a sequence used for demodulating the first signal to be demodulated.

For, other signal resource blocks shown in FIG. 6 which belong to some signals other than the first signal to be demodulated and the second signal to be demodulated, a subcarrier 0 of a common resource block 0 is determined as a reference point for mapping a sequence of the common reference signal.

According to the embodiment of the present disclosure, in the time slot without the SSB, the terminal may determine the subcarrier 0 of the common resource block 0 as the reference point for mapping the sequence of the common reference signal, and determine the reference point for mapping the sequence respectively based on whether the frequency domain resource of the signal to be demodulated is located in the SSB frequency domain resource and/or the CORESET 0 frequency domain resource. The reference point for mapping the sequence of the common reference signal is determined in various ways, which facilitates users to select according to an actual situation.

According to an embodiment of the present disclosure, some signals other than the common reference signal are also configured. Specifically, the method for mapping a sequence of a common reference signal further includes: determining a downlink shared channel and a control channel for carrying some signals other than the common reference signal, and determining a subcarrier 0 of a resource block with a smallest number in the resource block where the CORESET 0 is located as a reference point for demodulating the downlink shared channel and the control channel.

According to the embodiment of the present disclosure, by multiplexing the scheme of determining the subcarrier 0 of the common resource block 0 as the reference point for mapping the sequence of the common reference signal in the existing technology, the terminal may determine the reference point for mapping the sequence of some signals other than the common reference signal, so that the mapping of the common reference signal can be realize to obtain the data of the common reference signal, which is conductive to improving the compatibility with the existing technology.

According to the embodiment of the present disclosure, by determining the reference point for mapping the sequence of the common reference signal, the mapping of the sequence of the common reference signal can be realized for obtaining data of the common reference signal. This remedies the existing technology, so that a demodulation of a downlink shared channel, a control channel and a broadcast channel can be realized.

Figure 7:
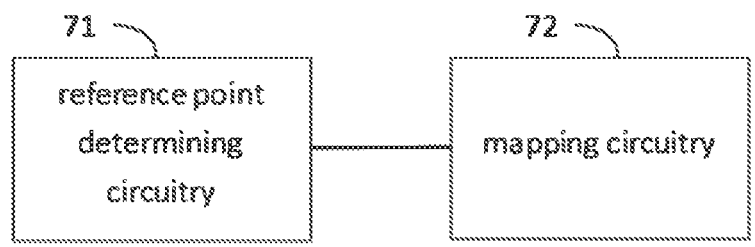
FIG. 7 schematically illustrates a structural diagram of an apparatus for mapping a sequence of a common reference signal according to an embodiment of the present disclosure.

Referring to FIG. 7, FIG. 7 schematically illustrates a structural diagram of an apparatus for mapping a sequence of a common reference signal according to an embodiment of the present disclosure. The apparatus may include a reference point determining circuitry 71 and a mapping circuitry 72.

The reference point determining circuitry 71 is adapted to determine a reference point for mapping the sequence of the common reference signal.

The mapping circuitry 72 is adapted to map the sequence of the common reference signal based on the reference point for obtaining data of the common reference signal.

For more details about the working principles and working modes of the apparatus for mapping a sequence of a common reference signal, reference may be made to the relevant descriptions in FIG. 1 to FIG. 6, which will not be repeated here.

In an embodiment of the present disclosure, a storage medium having computer instructions stored therein is provided, wherein once the computer instructions are executed, the method shown in FIG. 1 to FIG. 6 can be performed. The storage medium includes a computer-readable storage medium, such as a non-volatile memory or a non-transitory memory. The storage medium may also include an optical disk, a mechanical hard disk, a solid state hard disk, or the like.

In an embodiment of the present disclosure, a terminal including a memory and a processor is provided, wherein the memory has computer instructions stored therein, and the method shown in FIG. 1 to FIG. 6 can be performed, once the processor executes the computer instructions. The terminal may include, but is not limited to, a mobile phone, a computer, a tablet computer, or the like.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for mapping a sequence of a common reference signal, comprising:
   determining a reference point for mapping the sequence of the common reference signal; and
   mapping the sequence of the common reference signal based on the reference point to obtain data of the common reference signal;
   wherein the sequence of the common reference signal comprises a first sequence used for demodulating a Physical Broadcast Channel (PBCH), and said determining the reference point for mapping the sequence of the common reference signal comprises:
      determining a time slot with a Synchronization Signal and PBCH block (SSB); and
      in the time slot with the SSB, determining a subcarrier 0 of a resource block with a smallest number in a resource block where the SSB is located as the reference point for mapping the first sequence used for demodulating the PBCH.

2. The method according to claim 1, further comprising:
   determining a downlink shared channel and a control channel for carrying some signals other than the common reference signal; and
   determining a subcarrier 0 of a resource block with a smallest number in the resource block where a Control Resource Set (CORESET) 0 is located as a reference point for demodulating the downlink shared channel and the control channel.

3. An apparatus for mapping a sequence of a common reference signal, comprising:
   a reference point determining circuitry, adapted to determine a reference point for mapping the sequence of the common reference signal; and
   a mapping circuitry, adapted to map the sequence of the common reference signal based on the reference point to obtain data of the common reference signal;
   wherein the sequence of the common reference signal comprises a first sequence used for demodulating a Physical Broadcast Channel (PBCH), and the reference point determining circuitry is further configured to:
      determine a time slot with a Synchronization Signal and PBCH block (SSB); and
      in the time slot with the SSB, determine a subcarrier 0 of a resource block with a smallest number in a resource block where the SSB is located as the reference point for mapping the first sequence used for demodulating the PBCH.

4. A non-transitory storage medium storing one or more programs, the one or more programs comprising computer instructions, which, when executed by a processor, cause the processor to:
   determine a reference point for mapping a sequence of a common reference signal; and
   map the sequence of the common reference signal based on the reference point to obtain data of the common reference signal;
   wherein the sequence of the common reference signal comprises a first sequence used for demodulating a Physical Broadcast Channel (PBCH), and the processor is further caused to:
      determine a time slot with a Synchronization Signal and PBCH block (SSB); and
      in the time slot with the SSB, determine a subcarrier 0 of a resource block with a smallest number in a resource block where the SSB is located as the reference point for mapping the first sequence used for demodulating the PBCH.

* * * * *